(12) United States Patent
Abuelsaad et al.

(10) Patent No.: US 9,661,033 B2
(45) Date of Patent: *May 23, 2017

(54) IDENTIFYING INTENDED COMMUNICATION PARTNERS IN ELECTRONIC COMMUNICATIONS

(71) Applicant: International Business Machines Corporation, Armonk, NY (US)

(72) Inventors: Tamer E. Abuelsaad, Somers, NY (US); David W. Harrison, Patterson, NY (US); Brent Hodges, Raleigh, NY (US); John E. Moore, Jr., Brownsburg, NY (US)

(73) Assignee: International Business Machines Corporation, Armonk, NY (US)

(*) Notice: Subject to any disclaimer, the term of this patent is extended or adjusted under 35 U.S.C. 154(b) by 218 days.

This patent is subject to a terminal disclaimer.

(21) Appl. No.: 14/036,295

(22) Filed: Sep. 25, 2013

(65) Prior Publication Data

US 2014/0304621 A1    Oct. 9, 2014

Related U.S. Application Data

(63) Continuation of application No. 13/856,837, filed on Apr. 4, 2013.

(51) Int. Cl.
*H04L 29/06* (2006.01)
*H04L 29/12* (2006.01)

(52) U.S. Cl.
CPC ...... *H04L 65/1069* (2013.01); *H04L 61/1594* (2013.01)

(58) Field of Classification Search
None
See application file for complete search history.

(56) References Cited

U.S. PATENT DOCUMENTS

| | | | |
|---|---|---|---|
| 7,039,639 B2 | 5/2006 | Brezin et al. | G06F 17/30 707/10 |
| 7,693,945 B1 | 4/2010 | Dulitz et al. | G06F 15/16 709/206 |
| 7,822,988 B2 | 10/2010 | Cameron et al. | H04L 9/323 713/180 |
| 2003/0037112 A1* | 2/2003 | Fitzpatrick et al. | 709/205 |
| 2004/0223648 A1* | 11/2004 | Hoene et al. | 382/218 |

(Continued)

OTHER PUBLICATIONS

Riyadh "Towards Security and Balance in Email Through Correspondence Negotiation," Master's Thesis, Simon Fraser University, Burnaby, BC, Canada Summer 2005.

(Continued)

*Primary Examiner* — Tuan S Nguyen
(74) *Attorney, Agent, or Firm* — Ido Tuchman; Kurt P. Goudy

(57) ABSTRACT

An apparatus, computer program product, and method for assisting communication with an intended communication partner. The apparatus may include a user interface and at least one computer processor. The computer processor initiates a communication session with a first contact. The processor identifies at least one second contact that has a potential to be confused with the first contact and highlights at least one difference between the first contact and the second contact in the user interface.

14 Claims, 4 Drawing Sheets

(56) References Cited

U.S. PATENT DOCUMENTS

| | | | |
|---|---|---|---|
| 2005/0047633 A1* | 3/2005 | Morguet | 382/124 |
| 2005/0114447 A1 | 5/2005 | Cameron et al. | G06F 15/16 709/204 |
| 2005/0198299 A1 | 9/2005 | Beck et al. | G06F 15/173 709/226 |
| 2007/0192414 A1 | 8/2007 | Chen et al. | G06F 15/16 709/205 |
| 2009/0287763 A1* | 11/2009 | Svendsen | G06Q 30/02 709/203 |
| 2013/0031061 A1* | 1/2013 | Jagota | G06Q 30/01 707/690 |
| 2013/0246449 A1* | 9/2013 | Balannik et al. | 707/758 |
| 2014/0129212 A1* | 5/2014 | Danielyan et al. | 704/9 |
| 2014/0280833 A1* | 9/2014 | Gao et al. | 709/223 |

OTHER PUBLICATIONS

Guerin et al., "Agent Communication Frameworks and Verification," AAMAS 2002 Workshop on Agent Communication Languages, Bologna, LNCS volume. vol. 2650. 2002.
Whitepages, User Interface, Whitepages.com, 2012.
Peoplesearch, User Interface, Peoplesearch,com, 2012.

\* cited by examiner

IDENTIFYING INTENDED COMMUNICATION PARTNERS IN ELECTRONIC COMMUNICATIONS

CROSS-REFERENCE TO RELATED APPLICATIONS

This application claims priority under 35 U.S.C. §120 to U.S. patent application Ser. No. 13/856,837 filed Apr. 4, 2013, the entire text of which is specifically incorporated by reference herein.

BACKGROUND

This invention relates to electronic communication, and more particularly to assisting communication with an intended communication partner.

The number of available electronic communication mediums and potential electronic contacts is rapidly expanding. As a result, the likelihood that an electronic communication is with one of one or more other contacts with similar identities is also increasing. In electronic communications it is therefore increasingly likely that the originator of a message will mistakenly select an unintended recipient. It also becomes more likely that the message recipient may respond to a message believing the sender to be someone else.

BRIEF SUMMARY

Accordingly, one example aspect of the present invention is an apparatus for assisting communication with an intended communication partner. The apparatus includes a user interface and at least one computer processor. The computer processor initiates a communication session with a first contact. The processor identifies at least one second contact that has a potential to be confused with the first contact and highlights at least one difference between the first contact and the second contact in the user interface.

Another example of the present invention is a method for assisting communication with an intended communication partner. The method includes an initiation step for initiating a communication session with a first contact. An identification step identifies, by a computer processor, at least one second contact that has a potential to be confused with the first contact. A highlighting step highlights at least one difference between the first contact and the second contact in the user interface.

Yet another example of the present invention is a computer program product for assisting communication with an intended communication partner. The computer program product includes computer readable program code configured to initiate a communication session with a first contact. The computer readable program code identifies, by a computer processor, at least one second contact that has a potential to be confused with the first contact. The computer readable program code highlights at least one difference between the first contact and the second contact in a user interface.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
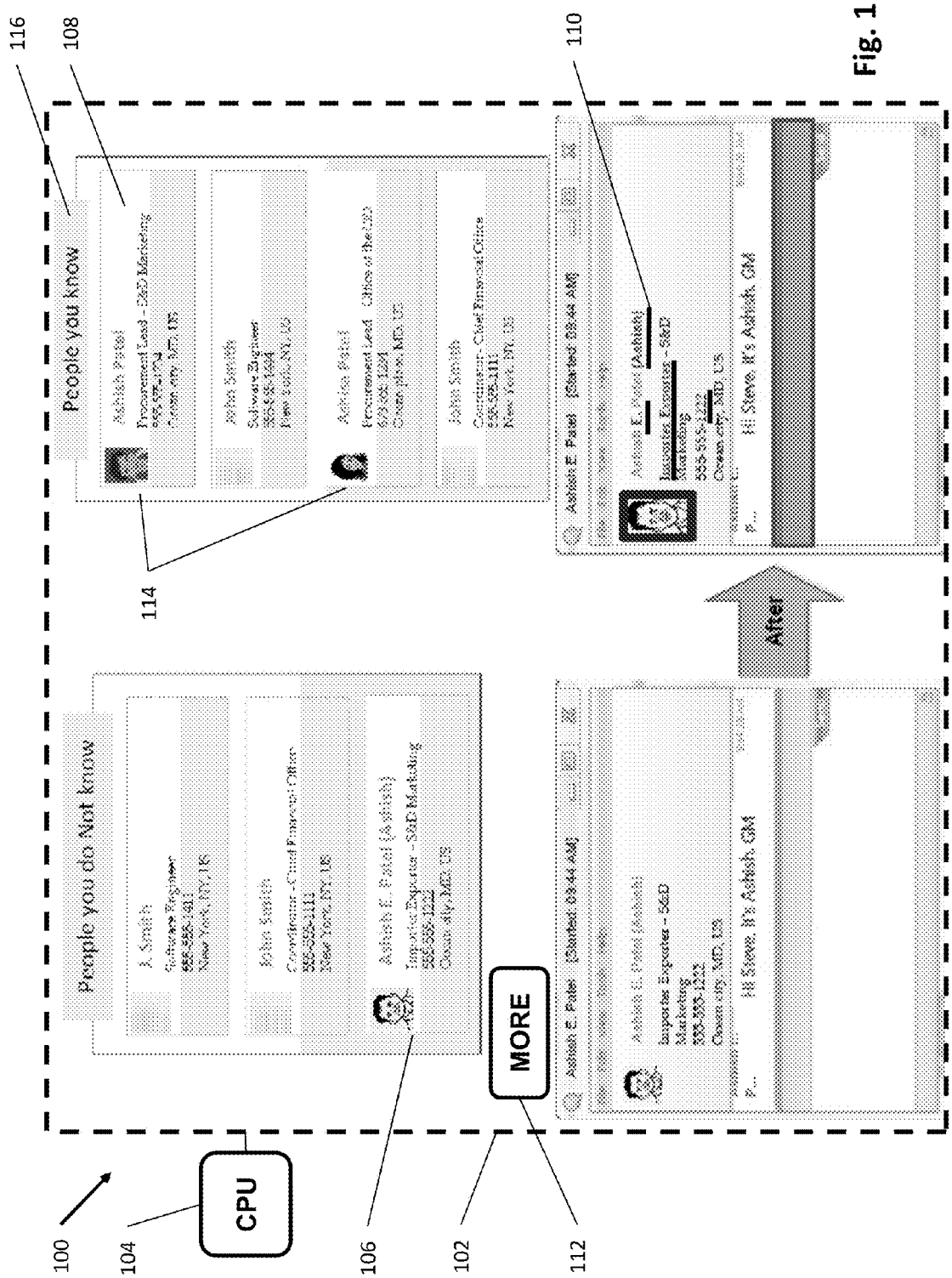
FIG. 1 shows an apparatus for assisting communication with an intended communication partner in accordance with one embodiment of the invention.

The present invention is described with reference to embodiments of the invention. Throughout the description of the invention reference is made to FIGS. 1-4. When referring to the figures, like structures and elements shown throughout are indicated with like reference numerals.

FIG. 1 shows an apparatus 100 for assisting communication with an intended communication partner in accordance with one embodiment of the invention. The apparatus 100 includes a user interface 102 and at least one computer processor 104 (e.g., a CPU). The computer processor 104 initializes a communication session with a first contact 106 and identifies at least one second contact 108 that has a potential to be confused with the first contact 106. The computer processor 104 highlights at least one difference 110 between the first contact 106 and the second contact 108 in the user interface 102. In one embodiment, highlighting means literally highlighting, underlining, coloring, or otherwise visually displaying the difference 110 between the first contact 106 and the second contact 108 in the user interface 102. In one embodiment, highlighting means producing sounds or other non-visual queues to note the difference 110 between the first contact 106 and the second contact 108 in the user interface 102.

In one embodiment, the user interface 102 includes a button 112 that can be pressed to highlight at least one additional difference 110 between the first contact 106 and the second contact 108.

In one embodiment, the computer processor 104 is further configured to calculate attribute distance values 404 (see also FIG. 4) for each difference 110 between the first contact 106 and the second contact 108. In this embodiment the computer processor 104 also highlights, in the user interface 102, the attributes of the first contact 106 whose attribute distance values 404 are above a difference threshold 408 (see FIG. 4).

Figure 4:
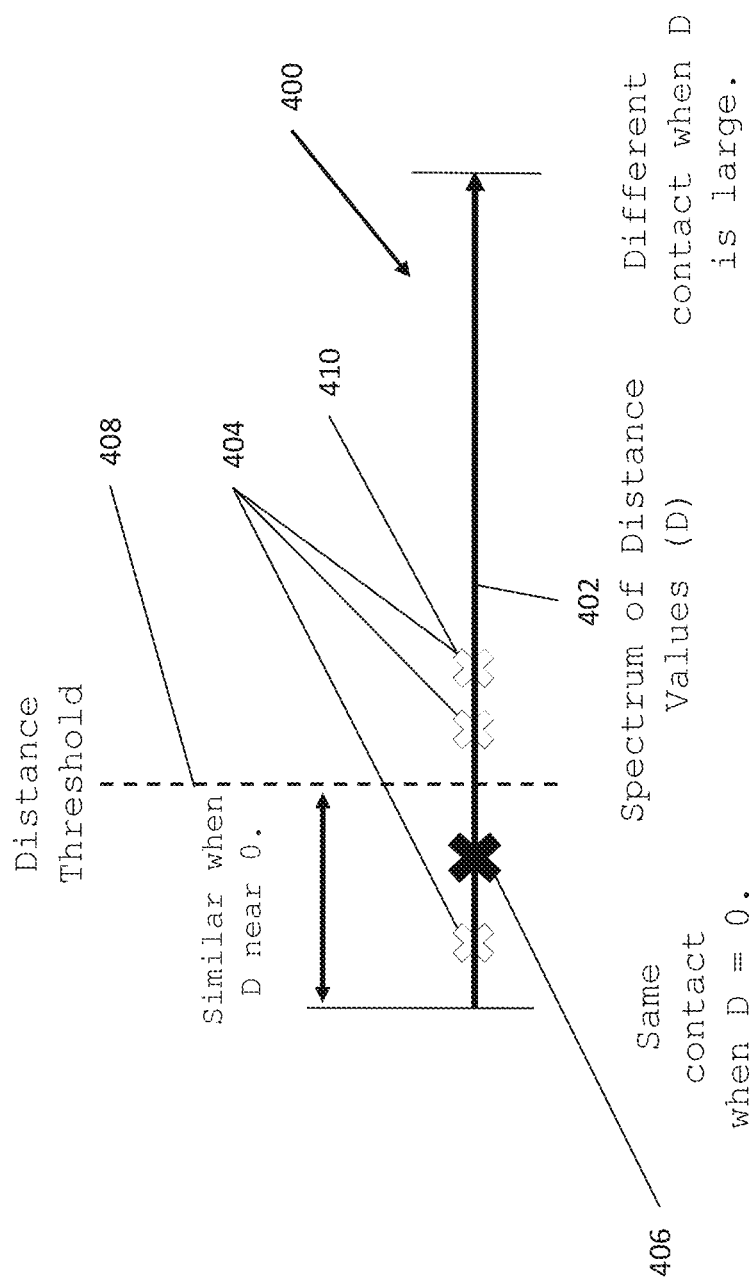
FIG. 4 shows a graphical representation of attribute distance values and the overall distance value across a spectrum of possible distance values.

In one embodiment, the computer processor 104 is further configured to individually weight each attribute distance value 404 such that at least one attribute distance value 404 has a greater relative impact on the overall distance value 406 (see FIG. 4).

In one embodiment, the computer processor 104 is further configured to calculate at least one attribute distance value 404 and an overall distance value 406 for at least one pair of contacts 114 in a contact list 116. In this embodiment, the computer processor 104 identifies a pair of contacts 114 in the contact list 116 whose overall distance value 406 is below a difference threshold 408. The computer processor 104 stores the pair of contacts 114 and at least one difference 110 between the pair of contacts 114.

In one embodiment, the computer processor 104 is further configured to calculate an overall distance value 406 between the first contact 106 and the second contact 108 based on all of the attribute distance values 404. In this embodiment the computer processor 104 highlights, in the user interface 102, that the first contact 106 and the second contact 108 are different contacts if the overall distance value 406 is below a difference threshold 408.

In one embodiment, each difference between the first contact 106 and the second contact 108 is selected from contact metadata which includes but is not limited to name, photo image, email address, area code, phone number, address, title, and company.

In one embodiment, at least one difference 110 between the first contact 106 and the second contact 108 is a user defined difference.

Figure 2:
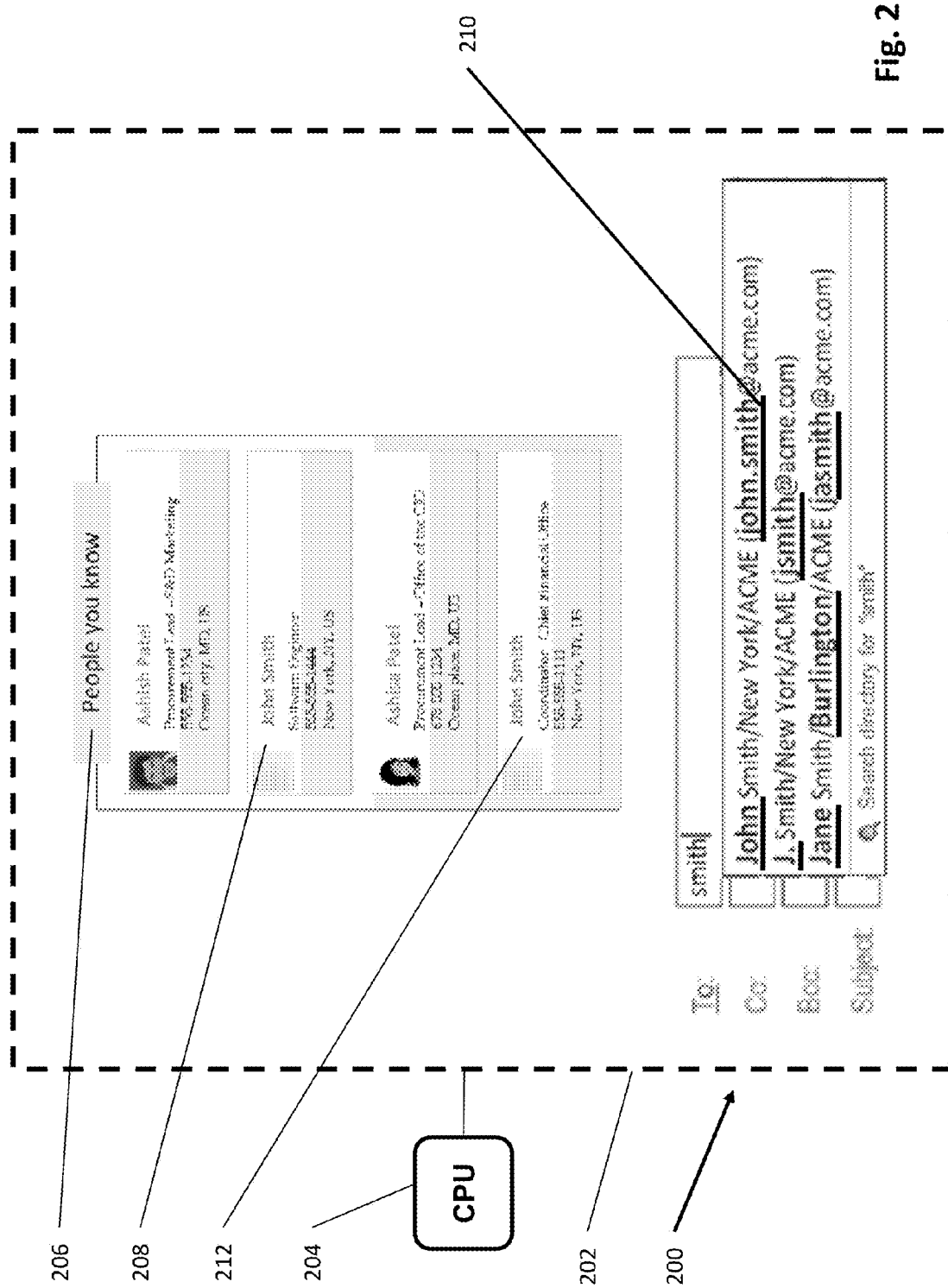
FIG. 2 shows another apparatus for assisting communication with an intended communication partner in accordance with one embodiment of the invention.

FIG. 2 shows another apparatus 200 for assisting communication with an intended communication partner in accordance with one embodiment of the invention. The apparatus 200 includes a user interface 202 and at least one computer processor 204 (e.g., a CPU). The user interface 202 includes a contact list 206. The computer processor 204 initiates a communication with a first contact 208 within the contact list 206. The computer processor 204 identifies at least one second contact 212 within the contact list 206 that has a potential to be confused with the first contact 208. The computer processor 204 highlights at least one difference 210 between the first contact 208 and the second contact 212 in the user interface 202.

Figure 3:
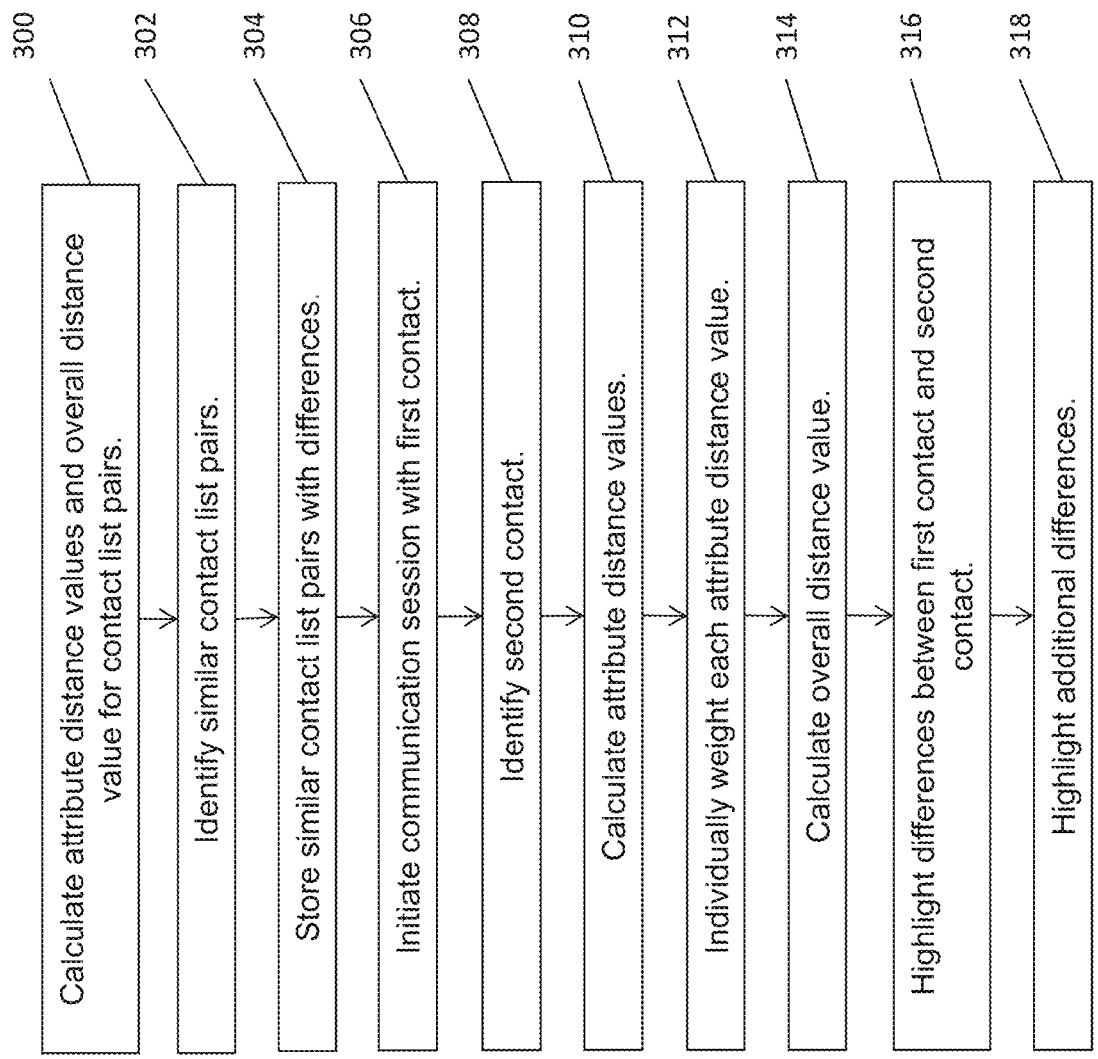
FIG. 3 shows a method for assisting communication with an intended communication partner in accordance with one embodiment of the invention.

FIG. 3 shows a method for assisting communication with an intended communication partner in accordance with one embodiment of the invention. In one embodiment, the method includes a calculating step 300. During the calculating step 300, at least one attribute distance value and an overall distance value are calculated for at least one pair of contacts in a contact list. After calculating step 300 is completed, the method continues to identification step 302.

At identification step 302, a pair of contacts in the contact list whose overall distance value is below a difference threshold is identified. After identification step 302 is completed, the method continues to storing step 304.

At storing step 304, the pair of contacts whose overall distance value is below a difference threshold 408 and at least one difference between the pair of contacts is stored. In one embodiment, each difference between the pair of contacts is selected from contact metadata which includes but is not limited to name, photo image, email address, area code, phone number, address, title, and company. In one embodiment, at least one difference between the pair of contacts is a user defined difference. After storing step 304 is completed, the method continues to initiation step 306.

At initiation step 306, a communication session with a first contact is initiated. After initiation step 306 is completed, the method continues to identification step 308.

At identification step 308, a computer processor identifies at least one second contact that has a potential to be confused with the first contact. After identification step 308 is completed, the method continues to calculation step 310.

At calculation step 310, attribute distance values for each difference between the first contact and the second contact are calculated. In one embodiment, each difference between the first contact and the second contact is selected from contact metadata which includes but is not limited to name, photo image, email address, area code, phone number, address, title, and company. In one embodiment, at least one difference between the first contact and the second contact is a user defined difference. In one embodiment, after calculation step 310 is completed, the method continues to weighting step 312.

At weighting step 312, each attribute distance value is individually weighted such that at least one attribute distance value has a greater relative impact on the overall distance value. After weighting step 312 is completed, the method continues to calculating step 314.

At calculating step 314, an overall distance value between the first contact and the second contact is calculated based on all of the attribute distance values. After calculating step 314 is completed, the method continues to highlighting step 316.

At highlighting step 316, at least one difference between the first contact and the second contact is highlighted in a user interface. In one embodiment, highlighting step 316 includes highlighting the attributes of the first contact whose attribute distance values are above a difference threshold 408. In another embodiment, highlighting step 316 includes highlighting that the first contact and the second contact are different contacts if the overall distance value is below a difference threshold. In one embodiment, after highlighting step 316 is completed the method continues to highlighting step 318.

At highlighting step 318, a button 112 in the user interface is pressed to highlight at least one additional difference between the first contact and the second contact.

FIG. 4 shows a graphical representation 400 of attribute distance values 404 and an overall distance value 406 across a spectrum of possible distance values 402. Communication contacts are the same contact when the overall distance value 406 is zero. Conversely, communication contacts are different contacts when the overall distance value 406 is large. Communication contacts are similar when the overall distance value 406 is nonzero and below a distance threshold 408. Similar contacts are difficult to distinguish and have a potential to be confused with each other. Similar contacts can be distinguished by highlighting at least one attribute whose attribute distance value 410 is above the distance threshold 408.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assisting communication with an intended communication partner, the method comprising:
    initiating a communication session with a first contact;
    calculating, by a computer processor, attribute distance values for each difference between the first contact and a second contact;
    calculating, by the computer processor, an overall distance value between the first contact and the second contact based on all of the attribute distance values; and
    highlighting at least one difference between the first contact and the second contact in a user interface in response to initiating the communication session with the first contact when the overall distance value between the first contact and the second contact is below a difference threshold.

2. The method of claim 1, further comprising:
    pressing a button in the user interface to highlight at least one additional difference between the first contact and the second contact.

3. The method of claim 1, further comprising:
    highlighting, in the user interface, the attributes of the first contact whose attribute distance values are below the difference threshold.

4. The method of claim 3, further comprising individually weighting each attribute distance value such that at least one attribute distance value has a greater relative impact on the overall distance value.

5. The method of claim 3, further comprising:
calculating at least one attribute distance value and the overall distance value for at least one pair of contacts in a contact list;
identifying a pair of contacts in the contact list whose overall distance value is below the difference threshold; and
storing the pair of contacts and the at least one difference between the pair of contacts.

6. The method of claim 1, further comprising:
highlighting, in the user interface, that the first contact and the second contact are different contacts if the overall distance value is below the difference threshold.

7. The method of claim 1, wherein each difference between the first contact and the second contact is selected from contact metadata including but not limited to consisting of name, photo image, email address, area code, phone number, address, title, and company.

8. The method of claim 1, wherein at least one difference between the first contact and the second contact is a user defined difference.

9. A method for assisting communication with an intended communication partner, the method comprising:
initiating a communication session with a first contact;
calculating, by a computer processor, attribute distance values for each difference between the first contact and a second contact;
calculating, by the computer processor, an overall distance value between the first contact and the second contact based on all of the attribute distance values; and
highlighting, in a user interface, the attributes of the first contact whose attribute distance values are below a difference threshold in response to initiating the communication session with the first contact when the overall distance value between the first contact and the second contact is below a difference threshold;
receiving a button press from the user interface to highlight at least one additional difference between the first contact and the second contact.

10. The method of claim 9, further comprising individually weighting each attribute distance value such that at least one attribute distance value has a greater relative impact on the overall distance value.

11. The method of claim 9, further comprising:
calculating at least one attribute distance value and the overall distance value for at least one pair of contacts in a contact list;
identifying a pair of contacts in the contact list whose overall distance value is below the difference threshold; and
storing the pair of contacts and the at least one difference between the pair of contacts.

12. The method of claim 9, further comprising:
calculating the overall distance value between the first contact and the second contact based on all of the attribute distance values; and
highlighting, in the user interface, that the first contact and the second contact are different contacts if the overall distance value is below the difference threshold.

13. The method of claim 9, wherein each difference between the first contact and the second contact is selected from contact metadata including but not limited to consisting of name, photo image, email address, area code, phone number, address, title, and company.

14. The method of claim 9, wherein at least one difference between the first contact and the second contact is a user defined difference.

* * * * *